United States Patent

Nagami et al.

Patent Number: 5,388,403
Date of Patent: Feb. 14, 1995

[54] EXHAUST GAS PURIFICATION DEVICE FOR AN ENGINE

[75] Inventors: Tetsuo Nagami, Nagoya; Hiroshi Hirayama, Okazaki, both of Japan

[73] Assignee: Toyota Jidosha Kabushiki Kaisha, Toyota, Japan

[21] Appl. No.: 203,206

[22] Filed: Feb. 28, 1994

[30] Foreign Application Priority Data

Mar. 12, 1993 [JP] Japan .................. 5-052426

[51] Int. Cl.⁶ .............................................. F01N 3/20
[52] U.S. Cl. .................................... 60/276; 60/285; 60/289; 60/307; 123/687
[58] Field of Search ............... 60/274, 276, 277, 285, 60/289, 307; 123/687, 703

[56] References Cited

U.S. PATENT DOCUMENTS

| | | | |
|---|---|---|---|
| 4,972,737 | 11/1990 | Makimoto | 60/276 |
| 5,119,631 | 6/1992 | Kayanuma | 60/289 |
| 5,163,412 | 11/1992 | Neu | 60/285 |
| 5,271,223 | 12/1993 | Hoshi | 60/285 |
| 5,325,663 | 7/1994 | Itoh | 60/276 |
| 5,331,809 | 7/1994 | Takeshima | 60/289 |
| 5,333,446 | 8/1994 | Itoh | 60/289 |

FOREIGN PATENT DOCUMENTS

| | | |
|---|---|---|
| 0503882 | 3/1992 | European Pat. Off. . |
| 61-58912 | 3/1986 | Japan . |
| 62-97630 | 5/1987 | Japan . |
| 62-107826 | 5/1987 | Japan . |
| 62-117620 | 5/1987 | Japan . |
| 1203609 | 8/1989 | Japan . |
| 156816 | 12/1989 | Japan . |
| 3135417 | 6/1991 | Japan . |

Primary Examiner—Ira S. Lazarus
Assistant Examiner—Daniel J. O'Connor
Attorney, Agent, or Firm—Kenyon & Kenyon

[57] ABSTRACT

An engine comprising an exhaust passage having therein a $NO_x$ absorbent which absorbs the $NO_x$ when the air-fuel ratio of the exhaust gas flowing into the $NO_x$ absorbent is lean and releases the absorbed $NO_x$ when the concentration of oxygen in the exhaust gas is lowered. When the air-fuel ratio of air-fuel mixture fed into the engine cylinder is made a rich air-fuel ratio or the stoichiometric air-fuel ratio, a secondary air is fed into the exhaust passage upstream of the $NO_x$ absorbent to make the air-fuel ratio of exhaust gas lean.

10 Claims, 8 Drawing Sheets

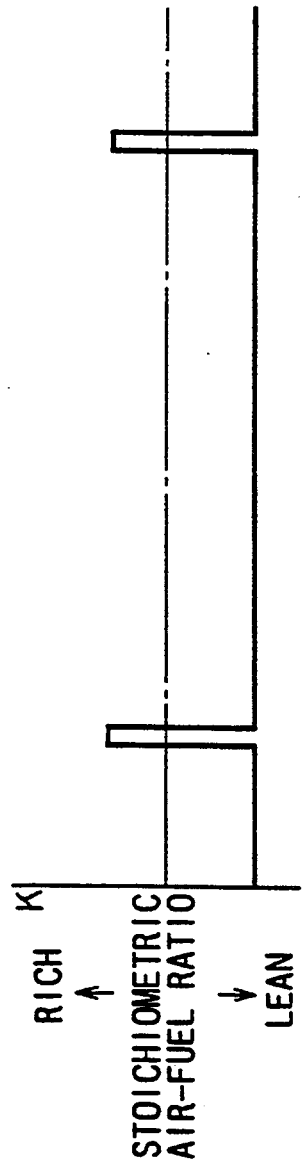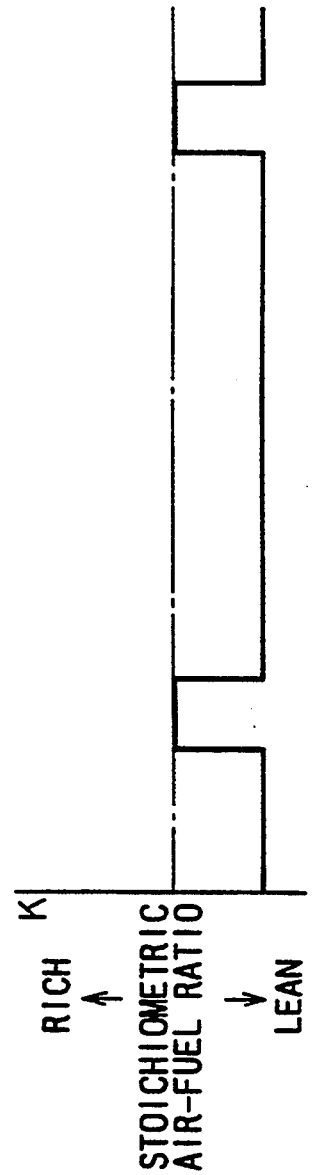

1

EXHAUST GAS PURIFICATION DEVICE FOR AN ENGINE

BACKGROUND OF THE INVENTION

1. Field of the Invention

The present invention relates to an exhaust gas purification device for an engine.

2. Description of the Related Art

In a known engine, a three way catalyst which is able to purify HC, CO and $NO_x$ at the same time is arranged in the exhaust passage. A good purifying operation by the three way catalyst can be obtained when the temperature of the three way catalyst is high, but the purifying operation by the three way catalyst cannot be expected when the temperature of the three way catalyst becomes low. Therefore, in a known engine, when the temperature of the three way catalyst becomes low, the air-fuel ratio of air-fuel mixture fed into the engine cylinders is made rich, and at the same time, a secondary air is fed into the exhaust passage upstream of the three way catalyst to promptly raise the temperature of the three way catalyst (Japanese Unexamined Patent Publication No. 61-58912). In this engine, a large amount of unburned HC and CO, which are discharged from the engine when the air-fuel mixture is made rich, are oxidized by a secondary air, and the temperature of the three way catalyst is caused to rise by the heat produced by the oxidizing reaction.

In this way, if a secondary air is fed into the exhaust passage, HC and CO are oxidized. At this time, however, the reducing operation of $NO_x$ is not carried out and, thus, in this engine, a problem arises in that a large amount of $NO_x$ is discharged into the outside air.

SUMMARY OF THE INVENTION

An object of the present invention is to provide an exhaust gas purification device capable of preventing unburned HC and CO and $NO_x$ from being discharged into the outside air no matter what air-fuel mixture is burned in the engine.

According to the present invention, there is provided an exhaust gas purification device of an engine having a combustion chamber and an exhaust passage, the device comprising: a $NO_x$ absorbent arranged in the exhaust passage and absorbing $NO_x$ when an air-fuel ratio of exhaust gas flowing into the $NO_x$ absorbent is lean, the $NO_x$ absorbent releasing absorbed $NO_x$ when a concentration of oxygen in the exhaust gas flowing into the $NO_x$ absorbent is lowered; air-fuel ratio control means for controlling an air-fuel ratio of air-fuel mixture formed in the combustion chamber; and secondary air supply means for feeding secondary air into the exhaust passage upstream of the $NO_x$ absorbent to make the air-fuel ratio of exhaust gas lean when the air-fuel ratio of air-fuel mixture is made rich by the air-fuel ratio control means.

The present invention may be more fully understood from the description of preferred embodiments of the invention set forth below, together with the accompanying drawings.

BRIEF DESCRIPTION OF THE DRAWINGS

In the drawings:

FIGS. 6A and 6B are views illustrating a $NO_x$ releasing time;

DESCRIPTION OF THE PREFERRED EMBODIMENTS

Figure 1:
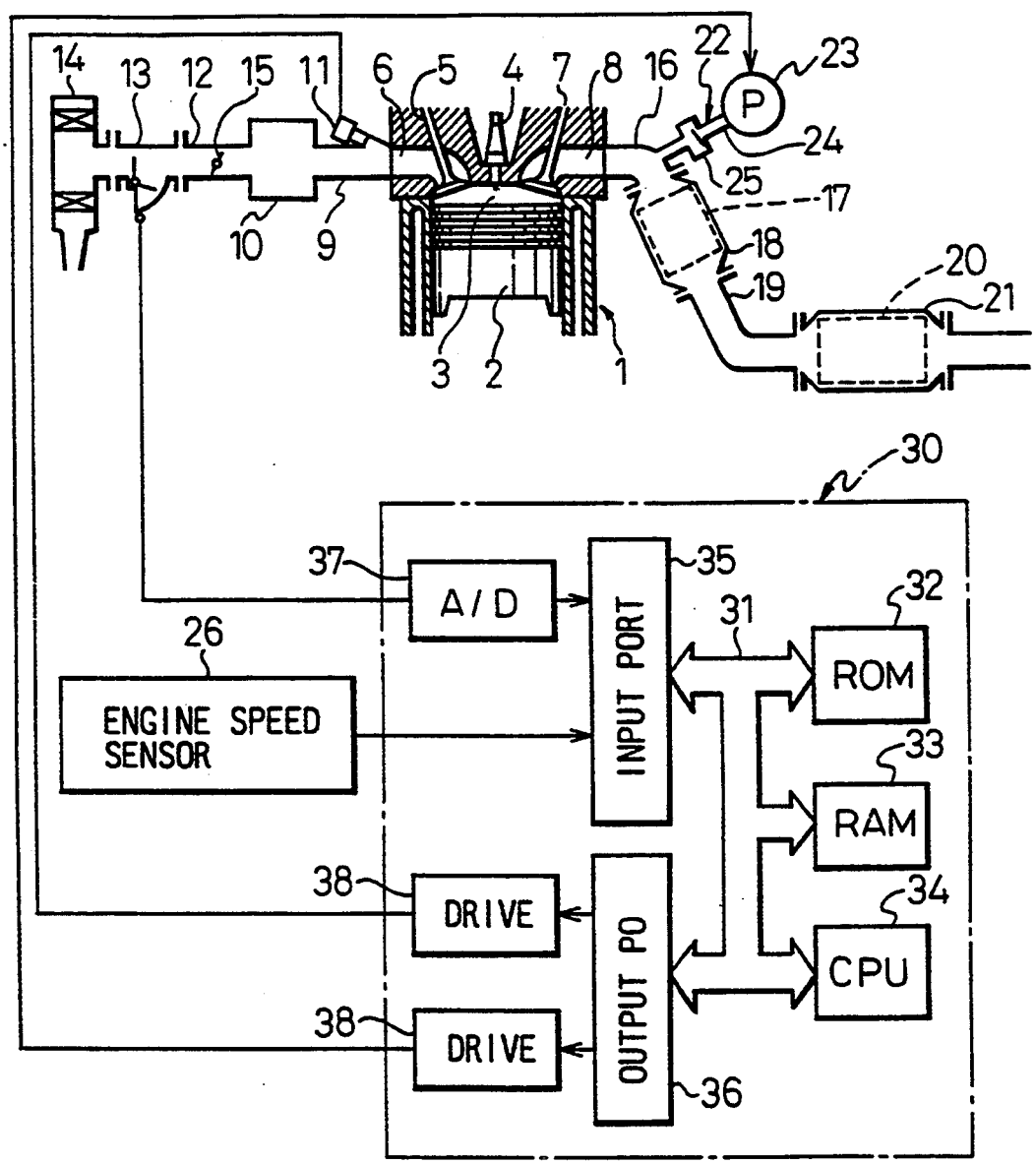
FIG. 1 is an overall view of an engine.

Referring to FIG. 1, reference numeral 1 designates an engine body, 2 a piston, 3 a combustion chamber, and 4 a spark plug; 5 designates an intake valve, 6 an intake port, 7 an exhaust valve, and 8 an exhaust port. The intake port 6 is connected to a surge tank 10 via a corresponding branch pipe 9, and a fuel injector 11 injecting the fuel toward the interior of the intake port 6 is attached to each branch pipe 9. The surge tank 10 is connected to an air cleaner 14 via an intake duct 12 and an air flow meter 13, and a throttle valve 15 is disposed in the intake duct 12. The exhaust port 8 is connected via an exhaust manifold 16 to a catalytic converter 18 including a three way catalyst 17 therein, and the catalytic converter 18 is connected via an exhaust pipe 19 to a casing 21 including a $NO_x$ absorbent 20 therein. A secondary air supply device 22 for feeding a secondary air into the exhaust passage 16 is attached to the exhaust manifold 16. This secondary air supply device 22 comprises an electrically operated air pump 23, a secondary air supply conduit 24 connecting the discharge port of the air pump 23 to the interior of the exhaust manifold 16, and a check valve 25 which allows only the flow of air toward the interior of the exhaust manifold 16.

An electronic control unit 30 comprises a digital computer and is provided with a ROM (read only memory) 32, a RAM (random access memory) 33, a CPU (microprocessor) 34, an input port 35, and an output port 36, which are interconnected by a bidirectional bus 31. The air flow meter 13 generates an output voltage proportional to the amount of air fed into the engine cylinders, and this output voltage is input via an AD converter 37 to the input port 35. In addition, an engine speed sensor 26 generating an output pulse expressing the engine speed is connected to the input port 35. The output port 36 is connected via the corresponding driving circuits 38 to the fuel injector 11 and the air pump 23.

Figure 2:
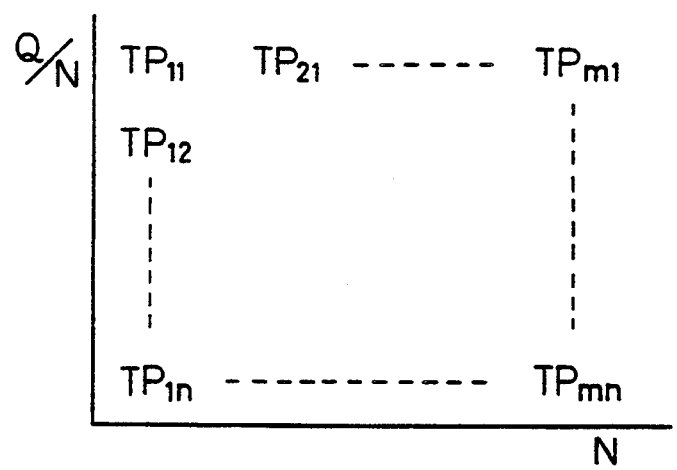
FIG. 2 is a view showing a map of a basic fuel injection time.

In the internal combustion engine shown in FIG. 1, the fuel injection time TAU is calculated based on, for example, the following equation.

$$TAU = TP \cdot K$$

where, TP is a basic fuel injection time, and K is a correction coefficient. The basic fuel injection time TP shows the fuel injection time necessary for bringing the air-fuel ratio of an air-fuel mixture fed into the engine cylinder to the stoichiometric air-fuel ratio. This basic fuel injection time TP is found in advance by experiment and is stored in advance in the ROM 32 in the form of a map as shown in FIG. 2 as the function of an engine load Q/N (Amount of air Q fed into the engine cylinder/engine speed N) and the engine speed N. The correction coefficient K is a coefficient for controlling the air-fuel ratio of the air-fuel mixture fed into the engine cylinder, and if K=1.0, the air-fuel mixture fed into the engine cylinder becomes the stoichiometric air-fuel ratio. Contrary to this, when K becomes smaller than 1.0, the air-fuel ratio of the air-fuel mixture fed into the engine cylinder becomes larger than the stoichiometric air-fuel ratio, that is, becomes lean, and when K becomes larger than 1.0, the air-fuel ratio of the air-fuel mixture fed into the engine cylinder becomes smaller than the stoichiometric air-fuel ratio, that is, becomes rich.

Figure 3:
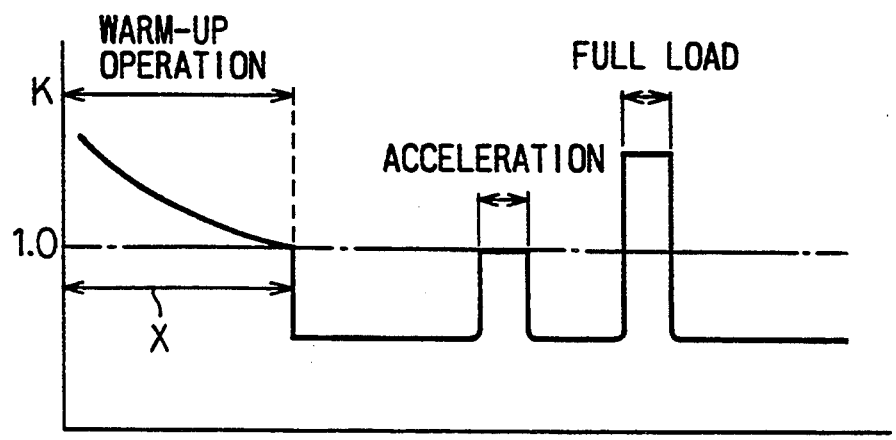
FIG. 3 is a view showing an example of control of the correction coefficient K.

This correction coefficient K is controlled in accordance with the operating state of the engine. FIG. 3 shows one embodiment of the control of this correction coefficient K. In the embodiment shown in FIG. 3, during a warm-up operation, the correction coefficient K is gradually lowered as the engine cooling water temperature becomes higher. When the warm-up is completed, the correction coefficient K is maintained at a constant value smaller than 1.0, that is, the air-fuel ratio of the air-fuel mixture fed into the engine cylinder is maintained as lean. Subsequently, when an acceleration operation is carried out, the correction coefficient K is brought to, for example, 1.0, that is, the air-fuel ratio of the air-fuel mixture fed into the engine cylinder is brought to the stoichiometric air-fuel ratio. When a full load operation is carried out, the correction coefficient K is made larger than 1.0. Namely, the air-fuel ratio of the air-fuel mixture fed into the engine cylinder is made rich. As seen from FIG. 3, in the embodiment shown in FIG. 3, except for the time of the warm-up operation, the time of the acceleration operation, and the time of the full load operation, the air-fuel ratio of the air-fuel mixture fed into the engine cylinder is maintained at a constant lean air-fuel ratio, and accordingly the lean air-fuel mixture is burned in a majority of the engine operation region.

Figure 4:
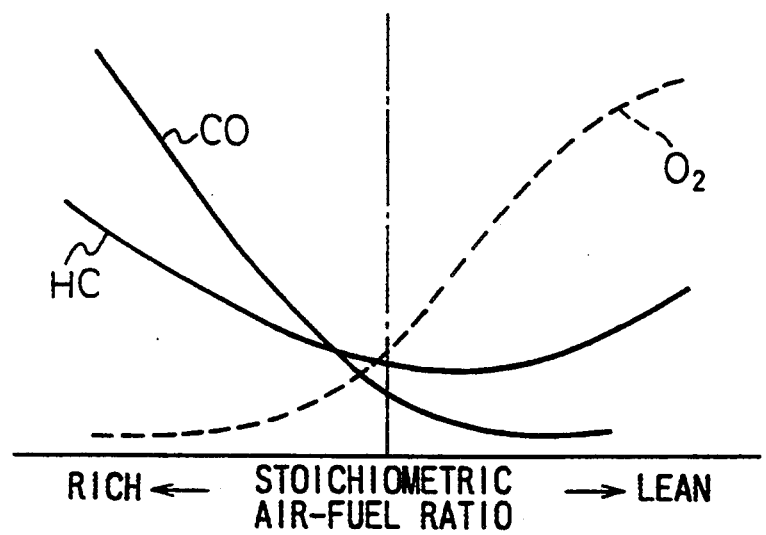
FIG. 4 is a diagram showing the concentration of unburned HC and CO and $O_2$ in the exhaust gas.

FIG. 4 schematically shows the concentration of representative components in the exhaust gas discharged from the combustion chamber 3. As seen from FIG. 4, the concentration of the unburnt HC and CO in the exhaust gas discharged from the combustion chamber 3 is increased as the air-fuel ratio of the air-fuel mixture fed into the combustion chamber 3 becomes richer, and the concentration of the oxygen $O_2$ in the exhaust gas discharged from the combustion chamber 3 is increased as the air-fuel ratio of the air-fuel mixture fed into the combustion chamber 3 becomes leaner.

The $NO_x$ absorbent 20 contained in the casing 21 uses, for example, alumina as a carrier. On this carrier, at least one substance selected from alkali metals, for example, potassium K, sodium Na, lithium Li, and cesium Cs; alkali-earth metals, for example, barium Ba and calcium Ca; and rare-earth metals, for example, lanthanum La and yttrium Y and precious metals such as platinum Pt, is carried. When referring to the ratio between the air and fuel (hydrocarbons) fed into the intake passage of the engine and the exhaust passage upstream of the $NO_x$ absorbent 20 as the air-fuel ratio of the inflowing exhaust gas to the $NO_x$ absorbent 20, this $NO_x$ absorbent 20 performs the absorption and releasing operation of $NO_x$ by absorbing the $NO_x$ when the air-fuel ratio of the inflowing exhaust gas is lean, while releasing the absorbed $NO_x$ when the concentration of oxygen in the inflowing exhaust gas falls. Note that, where the fuel (hydrocarbons) or air is not fed into the exhaust passage upstream of the $NO_x$ absorbent 20, the air-fuel ratio of the inflowing exhaust gas coincides with the air-fuel ratio of the air-fuel mixture fed into the combustion chamber 3, and at this time, the $NO_x$ absorbent 20 absorbs the $NO_x$ when the air-fuel ratio of the air-fuel mixture fed into the combustion chamber 3 is lean and releases the absorbed $NO_x$ when the concentration of oxygen in the air-fuel mixture fed into the combustion chamber 3 is lowered.

Figure 5A:
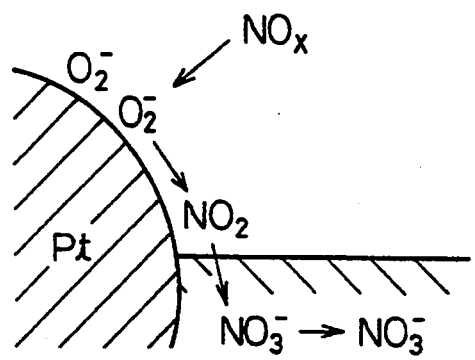
FIGS. 5A and 5B are views for explaining an absorbing and releasing operation of $NO_x$.
Figure 5B:
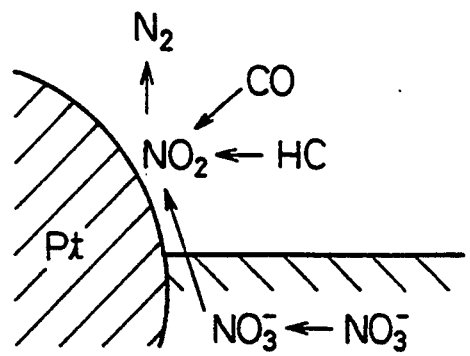

When the above-mentioned $NO_x$ absorbent 20 is disposed in the exhaust passage of the engine, this $NO_x$ absorbent 20 actually performs the absorption and releasing operation of $NO_x$, but there are areas of the exact mechanism of this absorption and releasing operation which are not clear. However, it can be considered that this absorption and releasing operation is conducted by the mechanism as shown in FIGS. 5A and 5B. This mechanism will be explained by using as an example a case where platinum Pt and barium Ba are carried on the carrier, but a similar mechanism is obtained even if another precious metal, alkali metal, alkali earth metal, or rare earth metal is used.

Namely, when the inflowing exhaust gas becomes considerably lean, the concentration of oxygen in the inflowing exhaust gas is greatly increased. At this time, as shown in FIG. 5A, the oxygen $O_2$ is deposited on the surface of the platinum Pt in the form of $O_2^-$ or $O^{2-}$. The NO in the inflowing exhaust gas reacts with the $O_2^-$ or $O^{2-}$ on the surface of the platinum Pt and becomes $NO_2$ ($2NO+O_2 \rightarrow 2NO_2$). Subsequently, a part of the produced $NO_2$ is oxidized on the platinum Pt and absorbed into the absorbent. While bonding with the barium oxide BaO, it is diffused in the absorbent in the form of nitric acid ions $NO_3^-$ as shown in FIG. 5A. In this way, $NO_x$ is absorbed into the $NO_x$ absorbent 20.

So long as the oxygen concentration in the inflowing exhaust gas is high, the $NO_2$ is produced on the surface of the platinum Pt, and so long as the $NO_x$ absorption ability of the absorbent is not saturated, the $NO_2$ is absorbed into the absorbent and nitric acid ions $NO_3^-$ are produced. Contrary to this, when the oxygen concentration in the inflowing exhaust gas is lowered and the production of $NO_2$ is lowered, the reaction proceeds in an inverse direction ($NO_3^- \rightarrow NO_2$), and thus nitric acid ions $NO_3^-$ in the absorbent are released in the form of $NO_2$ from the absorbent. Namely, when the oxygen concentration in the inflowing exhaust gas is lowered, the $NO_x$ is released from the $NO_x$ absorbent 20. As shown in FIG. 4, when the degree of leanness of the inflowing exhaust gas becomes low, the oxygen concentration in the inflowing exhaust gas is lowered, and accordingly when the degree of leanness of the inflowing exhaust gas is lowered, the $NO_x$ is released from the $NO_x$ absorbent 20 even if the air-fuel ratio of the inflowing exhaust gas is lean.

On the other hand, at this time, when the air-fuel ratio of the air-fuel mixture fed into the combustion chamber 3 is made rich and the air-fuel ratio of the inflowing exhaust gas becomes rich, as shown in FIG. 4, a large amount of unburnt HC and CO is discharged from the engine, and this unburnt HC and CO react with the oxygen $O_2^-$ or $O^{2-}$ on the platinum Pt and are oxidized. Also, when the air-fuel ratio of the inflowing exhaust gas becomes rich, the oxygen concentration in the inflowing exhaust gas is lowered considerably, and therefore the NO2 is released from the absorbent. This NO2 reacts with the unburnt HC and CO as shown in FIG. 5B and is reduced. In this way, when the NO2 no longer exists on the surface of the platinum Pt, the NO2 is successively released from the absorbent. Accordingly, when the air-fuel ratio of the inflowing exhaust gas is made rich, the $NO_x$ is released from the $NO_x$ absorbent 20 in a short time.

Namely, when the air-fuel ratio of the inflowing exhaust gas is made rich, first of all, the unburnt HC and CO immediately react with the $O_2^-$ or $^{2-}$ on the platinum Pt and are oxidized, and subsequently if the unburnt HC and CO still remain even though the $O_2^-$ or $O^{2-}$ on the platinum Pt is consumed, the $NO_x$ released from the absorbent and the $NO_x$ discharged from the engine are reduced by these unburnt HC and CO. Accordingly, when the air-fuel ratio of the inflow of exhaust gas is made rich, the $NO_x$ absorbed in the $NO_x$ absorbent 20 is released in a short time and in addition this released $NO_x$ is reduced, and therefore the discharge of $NO_x$ into the atmosphere can be blocked. Also, since the $NO_x$ absorbent 20 has the function of a reduction catalyst, even if the air-fuel ratio of the inflowing exhaust gas is made the stoichiometric air-fuel ratio, the $NO_x$ released from the $NO_x$ absorbent 20 can be reduced. However, where the air-fuel ratio of the inflowing exhaust gas is made the stoichiometric air-fuel ratio, the $NO_x$ is merely released gradually from the $NO_x$ absorbent 20, and therefore a slightly long time is required for releasing all $NO_x$ absorbed in the $NO_x$ absorbent 20.

When the degree of leanness of the inflowing exhaust gas is lowered as mentioned before, even if the air-fuel ratio of the inflowing exhaust gas is lean, the $NO_x$ is released from the $NO_x$ absorbent 20. Accordingly, to release the $NO_x$ from the $NO_x$ absorbent 20, it is satisfactory if the concentration of oxygen in the inflowing exhaust gas is lowered. Note, even if the $NO_x$ is released from the $NO_x$ absorbent 20, when the air-fuel ratio of the inflowing exhaust gas is lean, the $NO_x$ is not reduced in the $NO_x$ absorbent 20, and accordingly, in this case, it is necessary to provide a catalyst which can reduce the $NO_x$ downstream of the $NO_x$ absorbent 20 or supply a reducing agent downstream of the $NO_x$ absorbent 20. Of course, it is also possible to reduce the $NO_x$ downstream of the $NO_x$ absorbent 20 in this way, but it is rather preferable that the $NO_x$ be reduced in the $NO_x$ absorbent 20. Accordingly, in the embodiment according to the present invention, when the $NO_x$ should be released from the $NO_x$ absorbent 20, the air-fuel ratio of the inflow of exhaust gas is made the stoichiometric air-fuel ratio or rich, whereby the $NO_x$ released from the $NO_x$ absorbent 20 is reduced in the $NO_x$ absorbent 20.

In the embodiment according to the present invention, as mentioned above, the air-fuel ratio of the air-fuel mixture fed into the combustion chamber 3 is made rich at the time of the full load operation, and that of the air-fuel mixture is made the stoichiometric air-fuel ratio at the time of the acceleration operation, and therefore $NO_x$ is released from the $NO_x$ absorbent 20 at the time of the full load operation and at the time of the acceleration operation. However, when the frequency of such a full load operation or acceleration operation is low, even if the $NO_x$ is released from the $NO_x$ absorbent 20 only at the time of the full load operation and acceleration operation, the absorption ability of the $NO_x$ by the $NO_x$ absorbent 20 is saturated during the period where the lean air-fuel mixture is burned, and thus the $NO_x$ is no longer absorbed by the $NO_x$ absorbent 20. Accordingly, in the embodiment according to the present invention, when the lean air-fuel mixture is continuously burned, as shown in FIG. 6A, the air-fuel ratio of the inflow of exhaust gas is periodically made rich, or the air-fuel ratio of the inflow of exhaust gas is periodically made the stochiometric air-fuel ratio as shown in FIG. 6B.

The releasing operation of the $NO_x$ from the $NO_x$ absorbent 20 is carried out when a constant amount of $NO_x$ is absorbed into the $NO_x$ absorbent 20, for example when $NO_x$ of 50% of the absorption ability of the $NO_x$ absorbent 20 is absorbed. The amount of $NO_x$ absorbed into the $NO_x$ absorbent 20 is proportional to the amount of the exhaust gas discharged from the engine and the $NO_x$ concentration in the exhaust gas. In this case, the amount of the exhaust gas is proportional to the amount of air Q fed into the engine cylinder, and the $NO_x$ concentration in the exhaust gas is proportional to the engine load, and therefore the amount of $NO_x$ absorbed into the $NO_x$ absorbent 20 is correctly proportional to the amount of air Q and the engine load. Accordingly, the amount of the $NO_x$ absorbed in the $NO_x$ absorbent 20 can be estimated from the cumulative value of the product of the amount of the air Q with the engine load, but in the embodiment according to the present invention, it is simplified and the amount of $NO_x$ absorbed in the $NO_x$ absorbent 20 is estimated from the cumulative value of the engine speed.

An explanation will be given next of one embodiment of absorption and releasing control of the $NO_x$ absorbent 20 according to the present invention with reference to FIG. 7 and FIG. 8.

Figure 7:
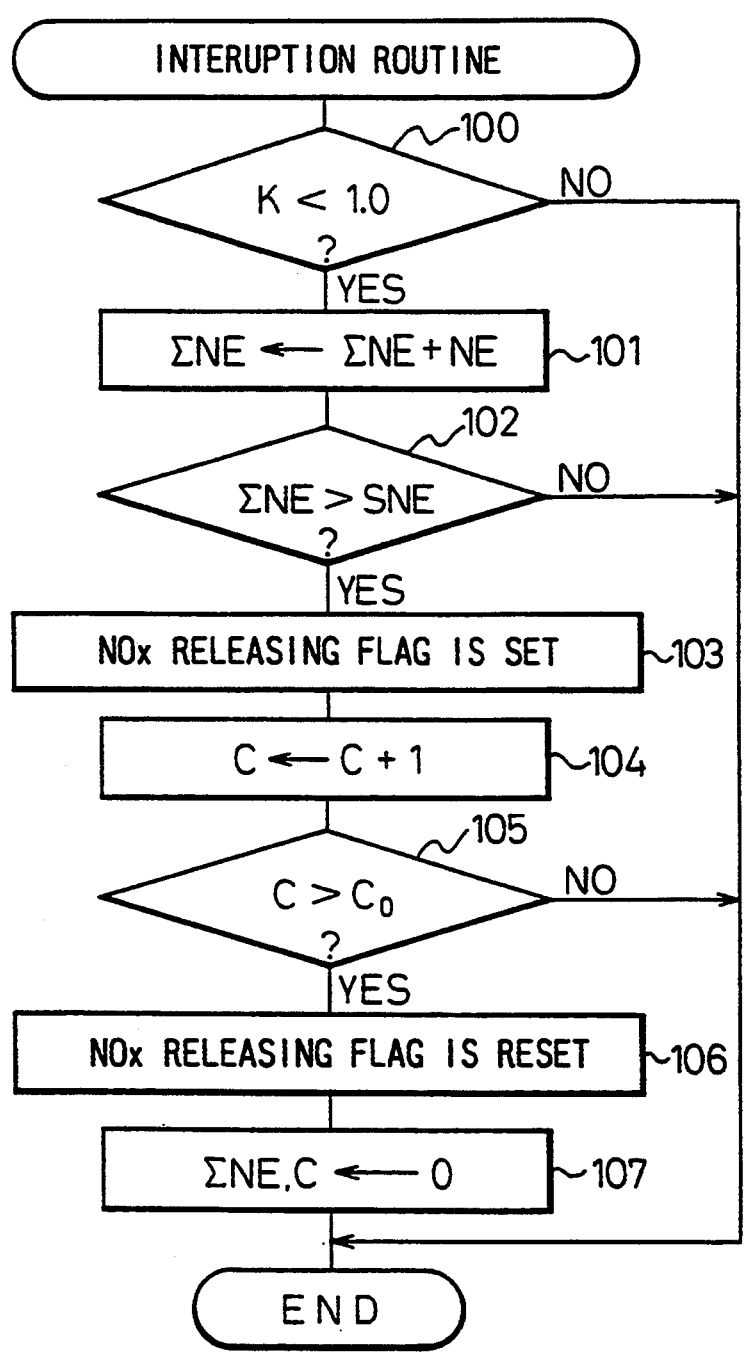
FIG. 7 is a flow chart of an interruption routine.

FIG. 7 shows an interruption routine executed at predetermined time intervals.

Referring to FIG. 7, first, it is judged at step 100 whether or not the correction coefficient K with respect to the basic fuel injection time TP is smaller than 1.0, that is, whether or not the lean air-fuel mixture is burned. When $K \geq 1.0$, that is, when the air-fuel ratio of the air-fuel mixture fed into the engine cylinder is the stoichiometric air-fuel ratio or rich, the processing cycle is completed. Conversely, when $K < 1.0$, that is, when the lean air-fuel mixture is burned, the processing routine goes to step 101, at which the result of addition of $\Sigma NE$ to the current engine speed NE is defined as $\Sigma NE$. Accordingly, this $\Sigma NE$ indicates the cumulative value of the engine speed NE. Subsequently, at step 102, it is judged whether or not the cumulative engine speed $\Sigma NE$ is larger than the constant value SNE. This constant value SNE shows a cumulative engine speed from which it is estimated that $NO_x$ in an amount of for example 50% of the absorption ability of $NO_x$ is absorbed by the $NO_x$ absorbent 20. When $\Sigma NE \leq SNE$, the processing cycle is completed, and when $\Sigma NE > SNE$, that is, when it is estimated that $NO_x$ in an amount of 50% of the $NO_x$ absorption ability of the $NO_x$ absorbent 20 is absorbed therein, the processing routine goes to step 103, and the $NO_x$ releasing flag is set. When the $NO_x$ releasing flag is set, as will be mentioned later, the air-fuel ratio of the air-fuel mixture fed into the engine cylinder is made rich.

Subsequently, at step 104, the count value C is incremented by "1". Subsequently, at step 105, it is judged whether or not the count value C becomes larger than a constant value $C_0$, that is, whether or not for example five seconds have elapsed. When $C \leq C_0$, the processing cycle is completed, and when C becomes larger than $C_0$, the processing routine goes to step 106, at which the $NO_x$ releasing flag is reset. When the $NO_x$ releasing flag is reset, as will be mentioned later, the air-fuel ratio of the air-fuel mixture fed into the engine cylinder is switched from rich to lean, and thus the air-fuel ratio of the air-fuel mixture fed into the engine cylinder is made rich for 5 seconds. Subsequently, at step 107, the cumulative engine speed $\Sigma NE$ and the count value C are brought to zero.

Figure 8:
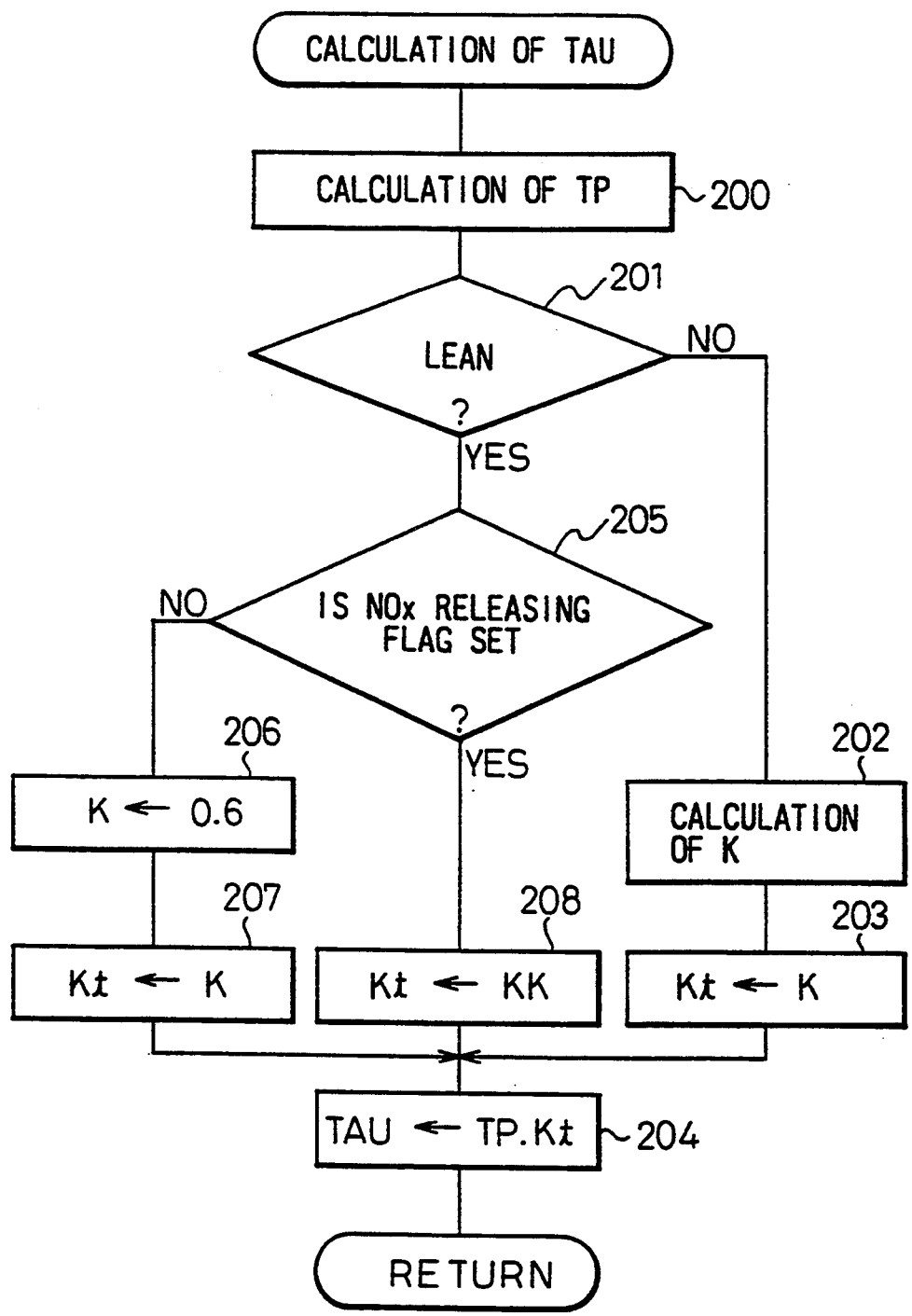
FIG. 8 is a flow chart for calculating the fuel injection time TAU.

FIG. 8 shows a calculation routine of the fuel injection time TAU. This routine is repeatedly executed.

Referring to FIG. 8, first, at step 200, a basic fuel injection time TP is calculated from a map indicated in FIG. 2. Subsequently, at step 201, it is judged whether or not the operation state is a state where combustion of the lean air-fuel mixture should be carried out. When it is not an operation state where combustion of the lean air-fuel mixture should be carried out, that is, at the time of the warm-up operation, acceleration operation, or full load operation, the processing routine goes to step 202, at which the correction coefficient K is calculated. At the time of an engine warm-up operation, this correction coefficient K is a function of the engine cooling water temperature and becomes smaller as the engine cooling water temperature becomes higher within a range indicated by $K \geq 1.0$. Also, at the time of the acceleration operation, the correction coefficient K is brought to 1.0, and at the time of the full load operation, the correction coefficient K is made a value larger than 1.0. Subsequently, at step 203, the correction coefficient K is made Kt, and subsequently, at step 204, the fuel injection time TAU ($=TP \cdot Kt$) is calculated. At this time, the air-fuel ratio of the air-fuel mixture fed into the engine cylinder is made the stoichiometric air-fuel ratio or rich.

Conversely, at step 201, when it is judged that the operation state is a state where combustion of the lean air-fuel mixture should be carried out, the processing routine goes to step 205, at which it is judged whether or not the $NO_x$ releasing flag has been set. When the $NO_x$ releasing flag has not been set, the processing routine goes to step 206, at which the correction coefficient K is made for example 0.6, and subsequently, at step 207, the correction coefficient Kt is made K, and then the processing routine goes to step 204. Accordingly, at this time, a lean air-fuel mixture is fed into the engine cylinder. On the contrary, when it is decided at step 205 that the $NO_x$ releasing flag has been set, the processing routine goes to step 208, at which Kt is made the preliminarily determined value KK, and subsequently the processing routine goes to step 204. This value KK is a value of from about 1.1 to 1.2 with which the air-fuel ratio of the air-fuel mixture fed into the engine cylinder becomes about 12.0 to 13.5. Accordingly, at this time, the rich air-fuel mixture is fed into the engine cylinder, whereby the $NO_x$ absorbed in the $NO_x$ absorbent 20 is released. Note that, at the releasing of $NO_x$, where the air-fuel mixture is to be made the stoichiometric air-fuel ratio, the value of KK is brought to 1.0.

As mentioned above, if the air-fuel ratio of the air-fuel mixture fed into the engine cylinder is changed over from a lean air-fuel ratio to a rich air-fuel ratio or the stoichiometric air-fuel ratio after a lean air-fuel mixture continues to be burned, the $NO_x$ absorbed in the $NO_x$ absorbent 20 is released therefrom. However, if the air-fuel ratio of the air-fuel mixture fed into the engine cylinder is maintained at a rich air-fuel ratio or the stoichiometric air-fuel ratio after the releasing operation of all the $NO_x$ absorbed in the $NO_x$ absorbent 20 is completed, not only are the unburnt HC and CO discharged into the outside air, but $NO_x$ produced in the combustion chamber 3 is also discharged into the outside air. Therefore, in the embodiment according to the present invention, a secondary air is fed into the exhaust manifold 16 from the secondary air supply device 22 to make the air-fuel ratio of the inflowing exhaust gas lean so that the unburnt HC and CO and the $NO_x$ can be purified even when the air-fuel ratio of the air-fuel mixture fed into the engine cylinder is maintained at a rich air-fuel ratio.

Namely, if the air-fuel ratio of the air-fuel mixture fed into the engine cylinder is made a rich air-fuel ratio or the stoichiometric air-fuel ratio, a large amount of $NO_x$ is discharged from the combustion chamber 3. At this time, if a secondary air in an amount enabling the air-fuel ratio of the inflowing exhaust gas to be made lean is fed into the exhaust manifold 16, the unburnt HC and CO are oxidized by the secondary air, and thus the unburnt HC and CO are properly purified.

In addition, if the air-fuel ratio of the air-fuel mixture fed into the engine cylinder is made a rich air-fuel ratio or the stoichiometric air-fuel ratio, $NO_x$ is also discharged from the combustion chamber 3 in addition to the unburnt HC and CO. At this time, however, since the air-fuel ratio of the exhaust gas discharged from the combustion chamber 3 is a rich air-fuel ratio or the stoichiometric air-fuel ratio, the $NO_x$ is not absorbed in the $NO_x$ absorbent 20. Nevertheless, at this time, if a secondary air in an amount enabling the air-fuel ratio of the exhaust gas to be made lean is fed into the exhaust manifold 16, the air-fuel ratio of the inflowing exhaust gas flowing into the $NO_x$ absorbent 20 becomes lean, and thus, $NO_x$ is absorbed in the $NO_x$ absorbent 20. In this way, if the $NO_x$ absorbent 20 is arranged in the exhaust passage, and a secondary air is fed into the exhaust passage upstream of the exhaust passage when the air-fuel ratio of the air-fuel mixture fed into the engine cylinder is made a rich air-fuel ratio or the stoichiometric air-fuel ratio, the unburned HC and CO are oxidized by the secondary air, and the $NO_x$ is absorbed in the $NO_x$ absorbent 20. Accordingly, it is possible to purify the unburnt HC and CO and the $NO_x$ at the same time.

When a lean air-fuel mixture is burned, the $NO_x$ is absorbed in the $NO_x$ absorbent 20 as mentioned earlier, and at this time, since excess air is contained in the exhaust gas, the unburnt HC and CO are properly oxidized. Accordingly, it is possible to simultaneously reduce the amount of the unburned HC and CO and the $NO_x$, discharged into the outside air irrespective of whether the air-fuel ratio of the air-fuel mixture fed into the engine cylinder is made a rich air-fuel ratio, or the stoichiometric air-fuel ratio, or a lean air-fuel ratio. This is a basic concept of the present invention.

Figure 9:
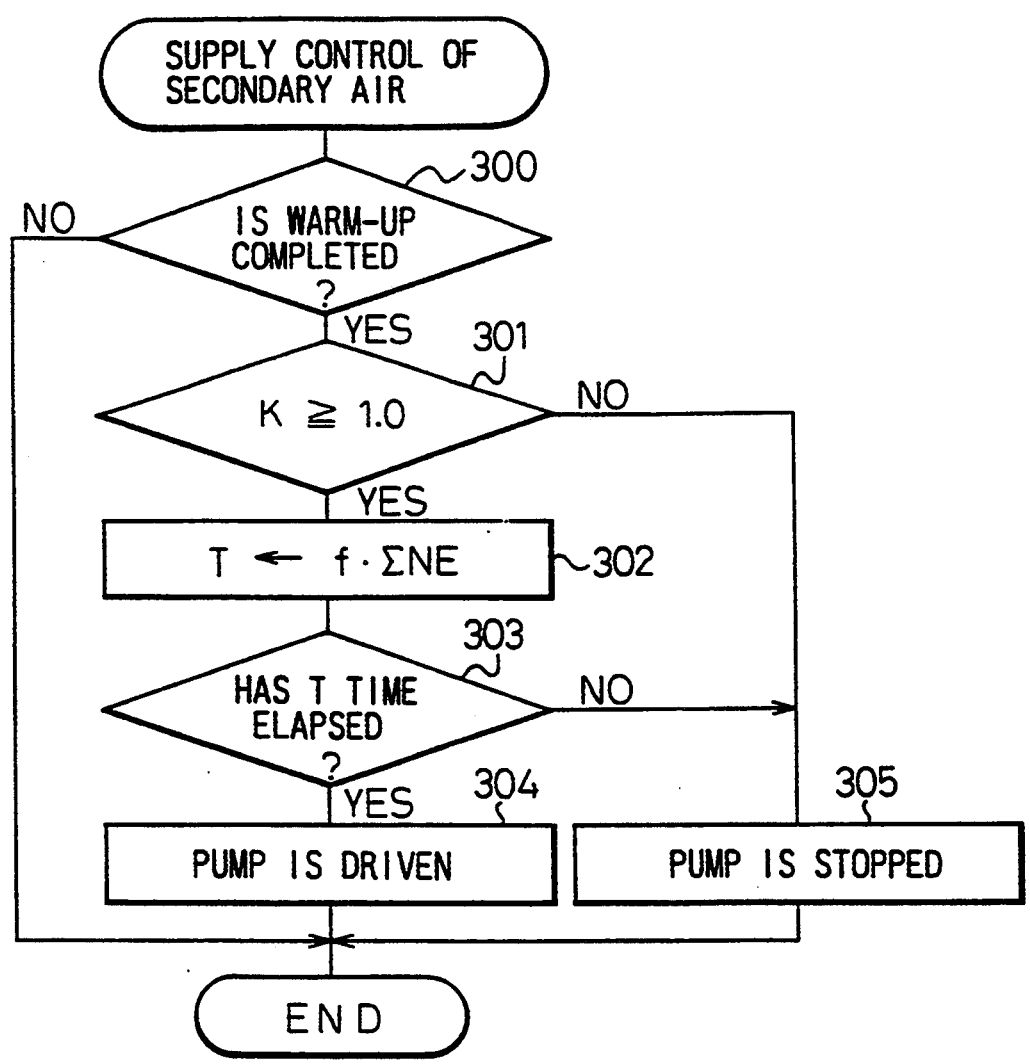
FIG. 9 is a flow chart for controlling the supply of secondary air.

FIG. 9 shows a secondary air supply control routine for executing this basic concept, and this routine is executed at predetermined time intervals.

Referring to FIG. 9, at step 300, it is judged whether or not the warm-up operation of the engine is completed. This is judged based on whether or not the temperature of the engine cooling water exceeds, for example, 70° C. Then, at step 301, it is judged whether or not $K \geq 1.0$, i.e., the air-fuel ratio of the air-fuel mixture fed into the engine cylinder is a rich air-fuel ratio or the stoichiometric air-fuel ratio. If $K < 1.0$, i.e., when a lean air-fuel mixture is burned, the routine jumps to step 305, and the air pump 23 is stopped. Conversely, if $K \geq 1.0$, i.e., when the accelerating operation or the full load operation of the engine is carried out, and thus, the air-fuel ratio of the air-fuel mixture fed into the engine cylinder is made a rich air-fuel ratio or the stoichiometric air-fuel ratio, the routine goes to step 302.

At step 302, a time T, taken until it is speculated that the releasing operation of the $NO_x$ from the $NO_x$ absorbent 20 is completed, is calculated by multiplying a coefficient f by the cumulative engine speed $\Sigma NE$ representing the absorbing amount of $NO_x$. Then, in step 303, it is judged whether or not the time T has elapsed. When the time T has not elapsed, the routine goes to step 305, and the air pump 23 remains stopped. Accordingly, at this time, the air-fuel ratio of the inflowing exhaust gas flowing into the $NO_x$ absorbent 20 is a rich air-fuel ratio or the stoichiometric air-fuel ratio, and thus the releasing operation of $NO_x$ from the $NO_x$ absorbent 20 is carried out.

When the time T has elapsed, the routine goes to step 304, and the air pump 23 is driven. Accordingly, the supply of a secondary air is started. At this time, the amount of the secondary air is determined so that the air-fuel ratio of the exhaust gas becomes a lean air-fuel ratio ranging from, for example, 15.0 to 15.5. Accordingly, at this time, the unburnt HC and CO discharged from the combustion chamber 3 are oxidized by the secondary air, and $NO_x$ discharged from the combustion chamber 3 is absorbed in the $NO_x$ absorbent 20. After this, when K becomes smaller than 1.0 again, the routine goes to step 305, and the supply of secondary air is stopped.

Next, an explanation will be given of a case wherein the basic concept of the present invention is applied to a method of purifying exhaust gas before the warm-up of the engine is completed.

In an engine, the air-fuel ratio of the air-fuel mixture must be made rich to obtain a stable combustion for a short time after the engine is started. Accordingly, at this time, a large amount of unburned HC and CO are discharged into the exhaust passage. To purify the unburnt HC and CO at this time, the three way catalyst 17 is arranged immediately downstream of the exhaust manifold 16, as illustrated in FIG. 1. However, the purifying operation of the unburnt HC and CO by the three way catalyst 17 is not carried out until the temperature of the three way catalyst 17 rises to some temperature. Therefore, in the embodiment according to the present invention, a secondary air in an amount enabling the air-fuel ratio of the exhaust gas to be made lean is fed from the secondary air supply device 22 for a short time after the engine is started.

If the secondary air is fed as mentioned above, the oxidizing operation of unburnt HC and CO is promoted and, due to the heat produced by the oxidizing reaction at this time, the temperature of the three way catalyst 17 is rapidly increased. As a result, the unburnt HC and CO can be purified by the three way catalyst 17 from an earlier time after the engine is started. In addition, at this time, $NO_x$ is discharged into the exhaust manifold 16, but the air-fuel ratio of the inflowing exhaust gas flowing into the $NO_x$ absorbent 20 is lean, and thus the $NO_x$ is absorbed in the $NO_x$ absorbent 20. Accordingly, it is possible to properly purify unburned HC and CO and $NO_x$ even before the warm-up of the engine is completed.

Figure 10:
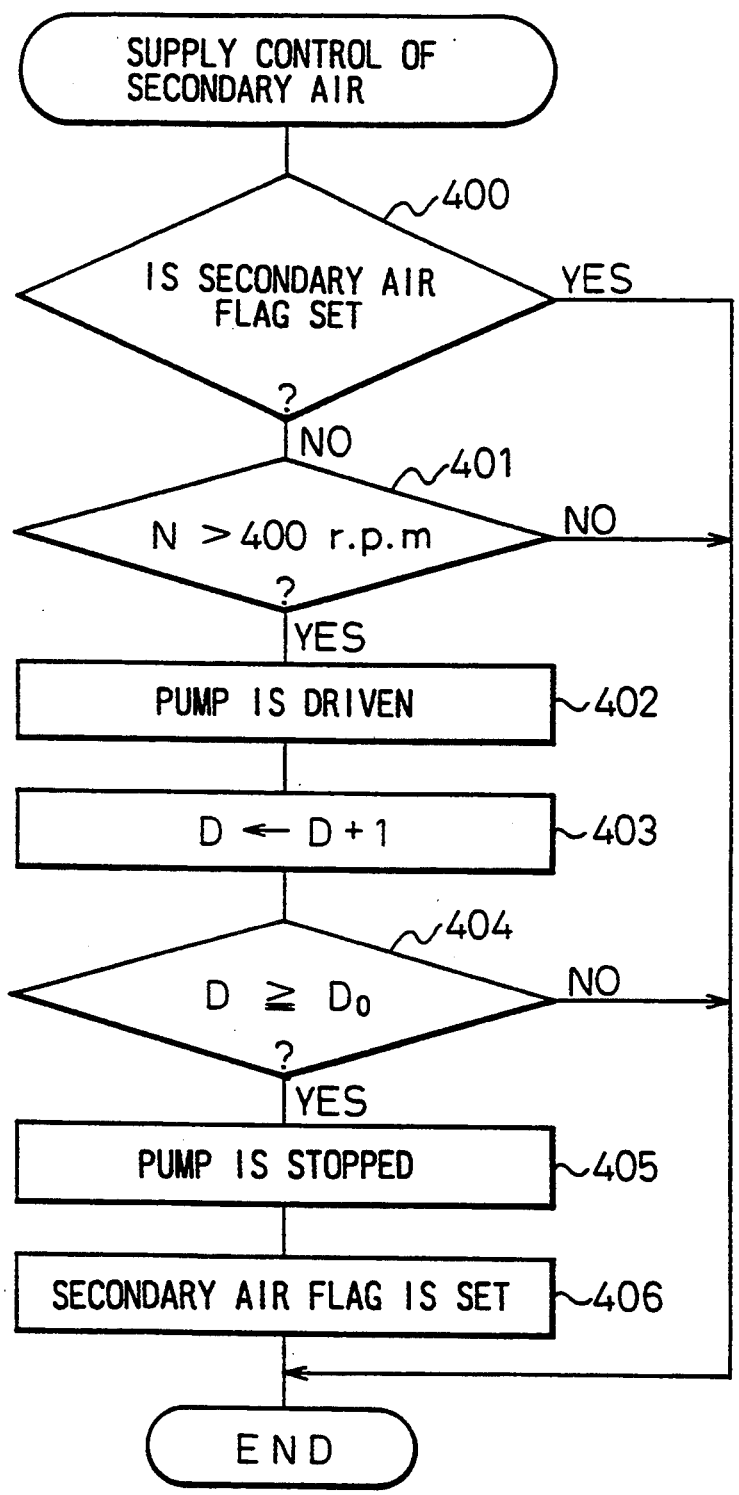
FIG. 10 is a flow chart for controlling the supply of secondary air before the warm-up of the engine is completed.

FIG. 10 shows a secondary air supply control routine executed before the warm-up of the engine is completed, and this routine is executed at predetermined time intervals.

Referring to FIG. 10, at step 400, it is judged whether or not a secondary air flag indicating that the feeding operation of secondary air is completed is set. When the starting operation of the engine is started, since the secondary air flag is reset, the routine goes to step 401, and it is judged whether or not the engine speed N exceeds for example 400 r.p.m., i.e., the engine begins to rotate by its own power. If the engine speed N exceeds 400 r.p.m., the routine goes to step 402, and the air pump 23 is driven. As a result, the supply of secondary air to the interior of the exhaust manifold 16 is started. Then, at step 403, the count value D is incremented by one, and then, in step 404, it is judged whether or not the count value D exceeds a fixed value $D_0$.

If the count value D exceeds the fixed value $D_0$, the routine goes to step 405, and the air pump 23 is stopped. As a result, the supply of secondary air is stopped. Then, at step 406, the secondary air flag is set. Note that this secondary air feeding operation is carried out only within the period shown by X in FIG. 1.

According to the present invention, it is possible to properly purify unburnt HC and CO and $NO_x$ irrespective of whether the air-fuel ratio of the air-fuel mixture fed into the engine cylinder is made a rich air-fuel ratio, or the stoichiometric air-fuel ratio, or a rich air-fuel ratio.

While the invention has been described by reference to specific embodiments chosen for purposes of illustration, it should be apparent that numerous modifications could be made thereto by those skilled in the art without departing from the basic concept and scope of the invention.

We claim:

1. An exhaust gas purification device of an engine having a combustion chamber and an exhaust passage, said device comprising:

a $NO_x$ absorbent arranged in the exhaust passage and absorbing $NO_x$ when an air-fuel ratio of exhaust gas flowing into said $NO_x$ absorbent is lean, said $NO_x$ absorbent releasing absorbed $NO_x$ when a concentration of oxygen in the exhaust gas flowing into said $NO_x$ absorbent is lowered;

air-fuel ratio control means for controlling an air-fuel ratio of an air-fuel mixture formed in the combustion chamber; and secondary air supply means for feeding secondary air into the exhaust passage upstream of said $NO_x$ absorbent to make said air-fuel ratio of exhaust gas lean when said air-fuel ratio of said air-fuel mixture is made rich by said air-fuel ratio control means.

2. An exhaust gas purification device according to claim 1, wherein a three way catalyst is arranged in the exhaust passage upstream of said $NO_x$ absorbent, and said secondary air supply means feeds the secondary air into the exhaust passage upstream of said three way catalyst.

3. An exhaust gas purification device according to claim 1, wherein said secondary air supply means feeds the secondary air into the exhaust passage upstream of said $NO_x$ absorbent to make said air-fuel ratio of exhaust gas lean when said air-fuel ratio of said air-fuel mixture is made the stoichiometric air-fuel ratio.

4. An exhaust gas purification device according to claim 1, wherein said secondary air supply means stops the feeding operation of the secondary air when said air-fuel ratio of said air-fuel mixture is made lean.

5. An exhaust gas purification device according to claim 1, wherein said secondary air supply means starts the feeding operation of the secondary air when a predetermined time has elapsed after said air-fuel ratio of said air-fuel mixture is made rich.

6. An exhaust gas purification device according to claim 5, wherein estimating means for estimating the amount of $NO_x$ absorbed in said $NO_x$ absorbent is provided, and said predetermined time is made longer as an estimated amount of $NO_x$ absorbed in said $NO_x$ absorbent becomes larger.

7. An exhaust gas purification device according to claim 6, wherein said estimated amount of $NO_x$ absorbed in said $NO_x$ absorbent is calculated from a cumulative engine speed.

8. An exhaust gas purification device according to claim 1, wherein said secondary air supply means feeds the secondary air into the exhaust passage for a predetermined time after the engine is started.

9. An exhaust gas purification device according to claim 1, wherein estimating means for estimating the amount of $NO_x$ absorbed in said $NO_x$ absorbent is provided, and said air-fuel ratio control means switches over said air-fuel ratio of air-fuel mixture from a lean air-fuel ratio to a rich air-fuel ratio to release $NO_x$ from said $NO_x$ absorbent when an estimated amount of $NO_x$ absorbed in said $NO_x$ absorbent exceeds a predetermined amount, prohibiting means being provided for prohibiting the supply of secondary air by said secondary air supply means when said estimated amount of $NO_x$ absorbed in said $NO_x$ absorbent exceeds said predetermined amount and when said air-fuel ratio control means switches over said air-fuel ratio of said air-fuel mixture from the lean air-fuel ratio to the rich air-fuel ratio.

10. An exhaust gas purification device according to claim 1, wherein said $NO_x$ absorbent contains at least one substance selected from alkali metals comprising potassium, sodium, lithium, cesium; alkali earth metals comprising barium, calcium; and rare earth metals comprising lanthanum, yttrium and contains platinum.

* * * * *